United States Patent [19]

Cucci

[11] 4,311,053
[45] Jan. 19, 1982

[54] VIBRATING BEAM PRESSURE SENSOR

[75] Inventor: Gerald R. Cucci, Minneapolis, Minn.

[73] Assignee: Rosemount, Inc., Eden Prairie, Minn.

[21] Appl. No.: 199,597

[22] Filed: Oct. 22, 1980

Related U.S. Application Data

[63] Continuation of Ser. No. 39,356, May 14, 1979, abandoned.

[51] Int. Cl.³ .............................. G01L 11/00
[52] U.S. Cl. ........................ 73/704; 73/718
[58] Field of Search ............... 73/704, 718, DIG. 1, 73/581, 778, 517 AV, 724, 702; 361/283

[56] References Cited

U.S. PATENT DOCUMENTS

| | | | |
|---|---|---|---|
| 3,124,961 | 3/1964 | Bedford | 73/497 |
| 3,187,579 | 6/1965 | Ferran et al. | 73/398 |
| 3,304,773 | 2/1967 | Rogallo | 73/141 |
| 3,393,565 | 7/1968 | Klee | 73/398 |
| 3,470,400 | 9/1969 | Weisbord | 310/15 |
| 3,479,536 | 11/1969 | Norris | 310/8.5 |
| 3,505,866 | 4/1970 | Weisbord et al. | 73/141 |
| 3,618,390 | 11/1971 | Frick | 73/398 C |
| 3,649,857 | 3/1972 | Knappe | 310/8.7 |
| 3,664,237 | 5/1972 | Paros | 92/38 |
| 3,762,223 | 10/1973 | Feuer et al. | 73/398 C |
| 4,089,036 | 5/1978 | Geronime | 361/283 |
| 4,118,977 | 10/1978 | Olsen et al. | 73/141 R |
| 4,149,422 | 4/1979 | Olsen et al. | 73/704 |

FOREIGN PATENT DOCUMENTS 1288378  9/1972  United Kingdom.

OTHER PUBLICATIONS

Digital Pressure Transducers, Jerome M. Paros, "Measurements and Data", Mar.–Apr. 1976, pp. 74–79.
Brochure—"Digiquartz Pressure Transducers", No. 1175, issued by Paroscientific, Inc., Redmond, Wash.
Specification Control Drawing for Digiquartz Pressure Transducer, Doc. No. 7001–001, Sheets 1 and 2, Paroscientific, Inc., Redmond, Wash.
Precision Digital Pressure Transducer, Jerome M. Paros, ISA—Publication #72-602, pp. 1–8.
Digital Quartz Transducers for Absolute Pressure Measurements, Jerome M. Paros, Presented at ISA 21st International Instrumentation Symposium, May 1975.

*Primary Examiner*—Donald O. Woodiel
*Attorney, Agent, or Firm*—Kinney, Lange, Braddock, Westman and Fairbairn

[57] ABSTRACT

A sensor providing an output indicating pressure including means to excite a vibrating beam at its natural frequency, and means to load the beam in response to pressure to alter the natural frequency of the beam. The frequency output is sensed by a capacitor pick off mounted on the same side of the beam as the means to excite the beam. Changes in the output frequency provides an indication of the pressure being measured.

18 Claims, 9 Drawing Figures

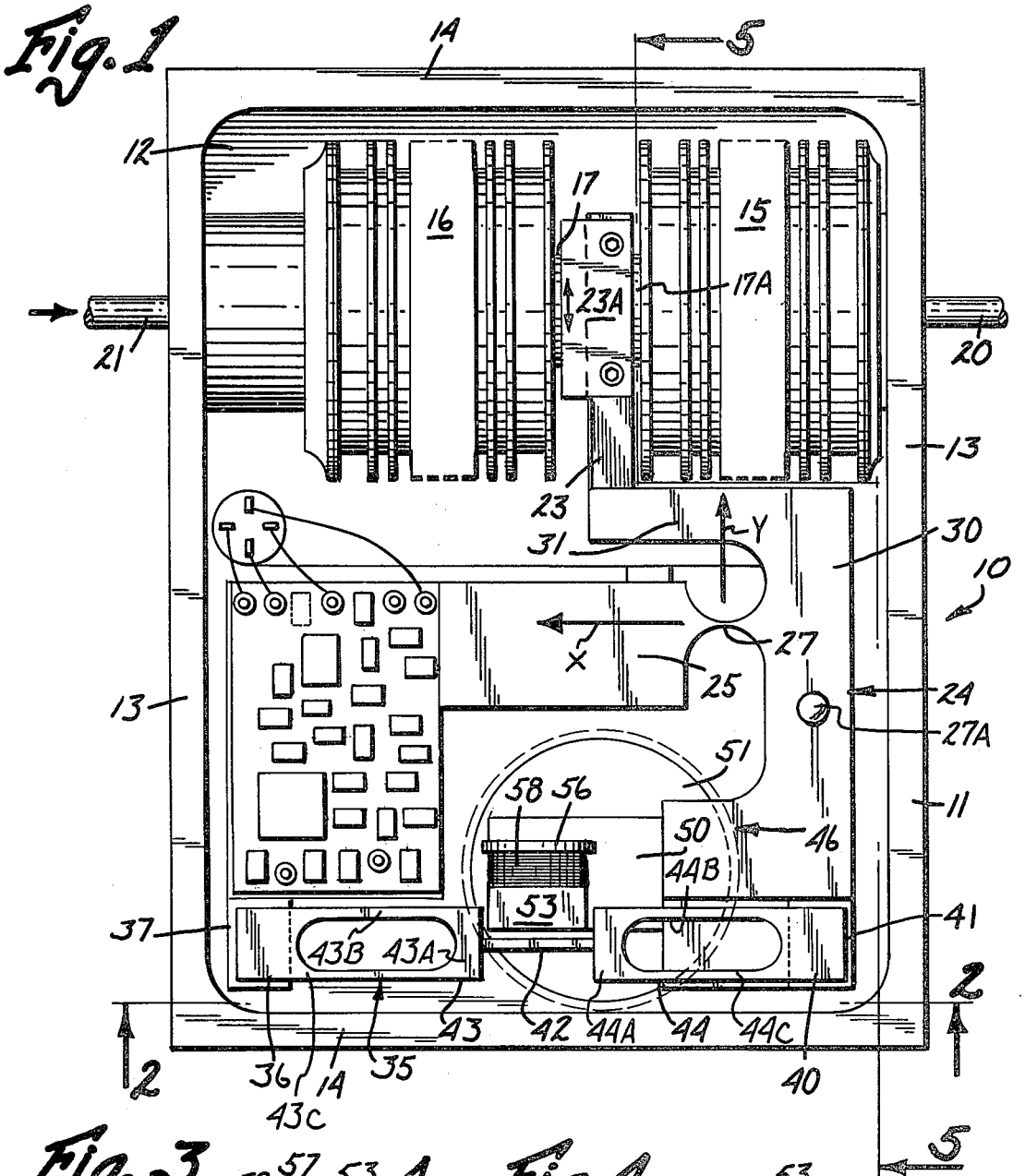
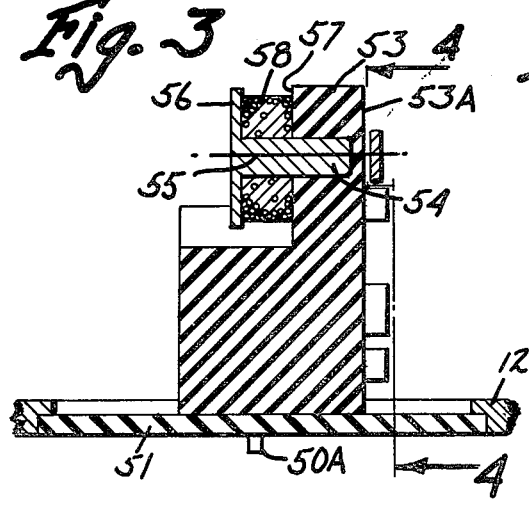
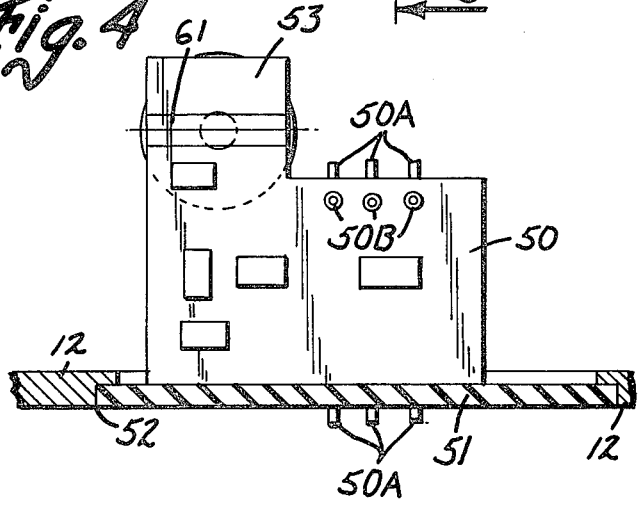

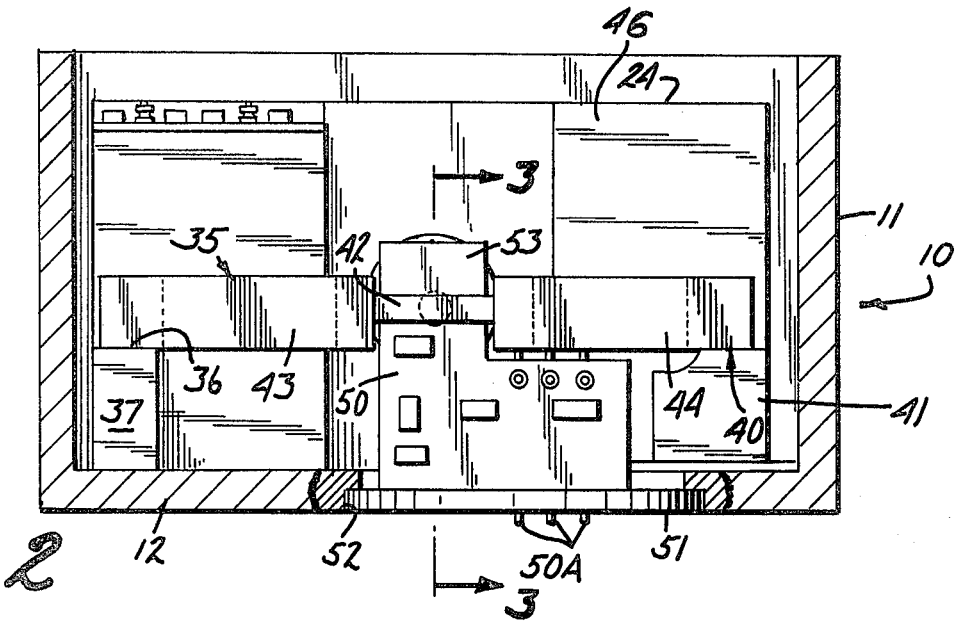
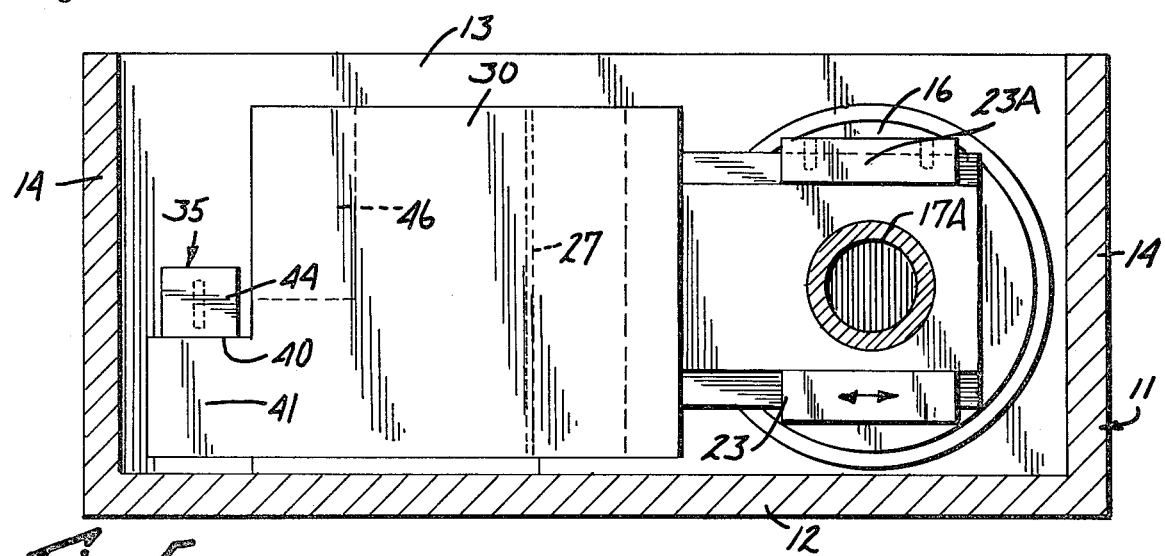
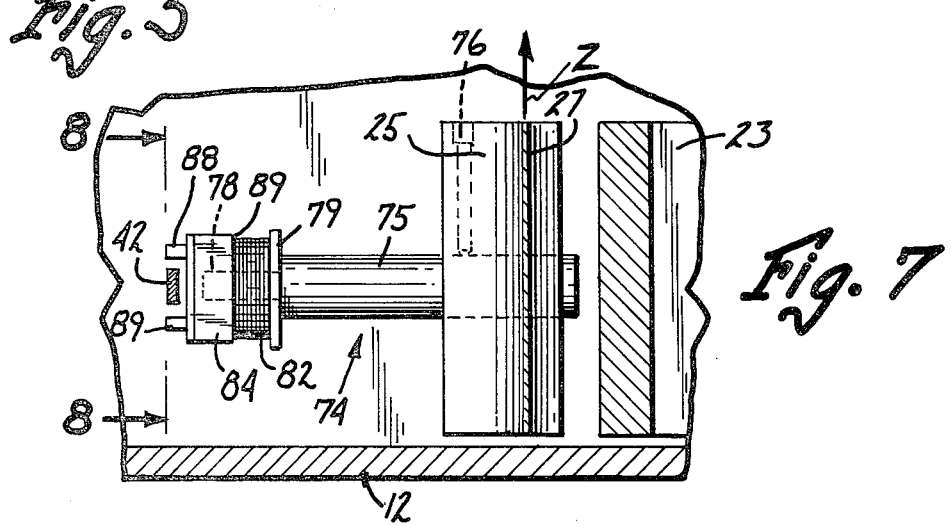

VIBRATING BEAM PRESSURE SENSOR

This is a continuation of application Ser. No. 39,356, filed May 14, 1979, now abandoned.

BACKGROUND OF THE INVENTION

1. Field of the Invention

The present invention relates to digital output pressure sensors using a vibrating beam as a sensing element.

2. Prior Art

In the prior art, various sensors which use vibrating beams have been advanced. Usually some type of digital pulse is provided to indicate the force or pressure derived force on the beam. Some of the sensors utilize piezoelectric sensing, such as U.S. Pat. Nos. 3,470,400 and 3,479,536. A type of pivoting beam that is constrained in its path of movement is also shown in U.S. Pat. No. 3,649,857.

An additional patent relating to vibrating beams is U.S. Pat. No. 3,664,237 which is of general interest. Capacitance sensing of vibrating beams is illustrated in U.S. Pat. Nos. 3,187,579 and 3,762,223. In both of these patents the sensing capacitor plate is on the opposite side of a member from the drive coil.

A piezoelectric beam which flexes transversely because of accelerations in the mass at the end of the beam, or because of impact of micro meteroids is shown in U.S. Pat. No. 3,304,773. An accelerometer using a vibrating beam with capacitance sensing is shown in U.S. Pat. No. 3,505,866.

U.S. Pat. No. 4,149,422 issued Apr. 17, 1979 shows a vibratory wire pressure sensor which discloses a thin wire that is held under a spring load to create a pretension, and is loaded by pressure so that the natural frequency of the wire changes. The lever which is utilized to load the vibrating wire is mounted with a cross flexure connection that permits relatively free pivotal movement. For sensing, a current from an oscillator is passed through the wire and this current reacts with a magnetic field from a permanent magnet thereby causing the wire to move. This produces a back EMF and positive feedback at the current generating oscillator circuit sustains the vibration of the wire. Thus the sensor disclosed in U.S. Pat. No. 4,149,422 does not utilize capacitive type sensing.

SUMMARY OF THE INVENTION

The present invention relates to a pressure sensor and more particularly to a pressure sensor which loads and affects the natural frequency of a vibrating beam. The frequency is sensed and provided to the output in the form of digital pulses that can provide a direct digital measurement or readout of the pressure being measured.

The beam is loaded through a pivotally mounted lever, as shown, which aids in isolating unwanted stresses during loading of the beam.

The excitation for the beam is from a coil driven by an oscillator, and the sensing is capacitance. There is, thus little interaction between the excitation and the sensing signals, which enhances accuracy.

In the particular embodiment shown, the excitation coil and the pick-off capacitor plate are mounted on the same side of the vibrating beam, to simplify mounting, and also to simplify adjustments as to the spacing between the drive coil, the sensing capacitor, and the vibrating beam. Other advantages include fewer parts, better control on parasitic resonances, and components of sensing circuit may be mounted on the pick-off assembly.

With the vibrating beam mounted as disclosed there is substantially no current in the beam, so that the beam has litle undesirable effect on the drive coil or the pick-off capacitor performance.

BRIEF DESCRIPTION OF THE DRAWINGS

FIG. 1 is a top plan view of the pressure sensor including sensing means made according to the present invention;

FIG. 2 is an elevational view taken as on line 2—2 in FIG. 1 with parts broken away;

FIG. 3 is a fragmentary sectional view taken as along line 3—3 in FIG. 2;

FIG. 4 is a view taken on line 4—4 in FIG. 3;

FIG. 5 is a sectional view taken as on line 5—5 in FIG. 1;

FIG. 7 is a side view of the coil and pick-up assembly used with the device of FIG. 6 taken as on line 7—7 in FIG. 6;

DESCRIPTION OF THE PREFERRED EMBODIMENT

Figure 6:
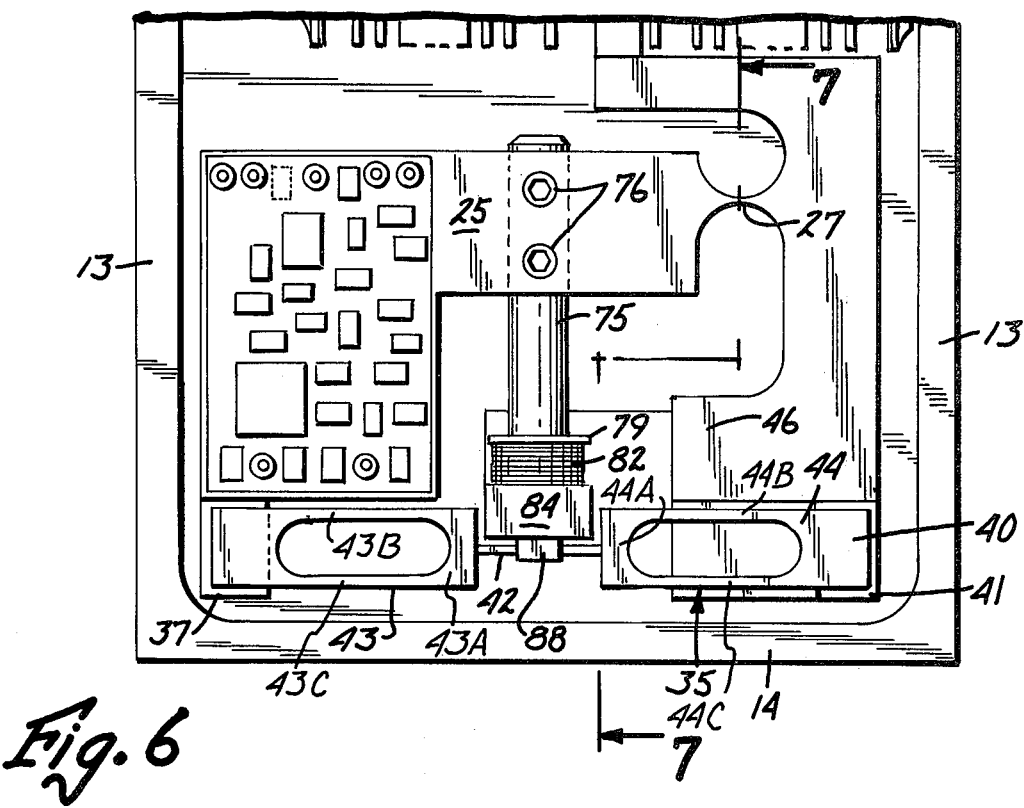
FIG. 6 is a fragmentary top plan view of a modified form of the invention.

In FIGS. 1 and 2, a general layout of a sensor made according to the present invention is shown. Such a sensor assembly is indicated generally at 10, and includes an outer housing 11 that provides a base for mounting the various components. The housing base indicated at 12 is a flat plate, and the housing includes upright walls 13 and 14. The exterior surface of housing 11 preferably has a silicone rubber coating approximately 0.062 inches in thickness deposited thereon to dampen exterior vibrations. Walls 13 are provided with apertures and mounting means for mounting a pair of bellows indicated at 15 and 16, respectively.

The bellows 16 has an end collar 17 that forms a small ring which fits partially within and is retained in a recess in a clamp 23A. The clamp 23A slidably fits over and may be slid along a tang 23 which forms a portion of a pivoting, loading lever assembly indicated generally at 24. The tang 23 extends between the bellows 15 and 16. The bellows 15 has an end ring 17A which partially fits with a recess in tang 23 and is thus connected to the tang 23. The bellows 15 and 16 transfer to the tang 23 loads from pressure which expand the bellows in an axial direction. The tang 23 has dove tail edge portions over which the clamp 23A mates and slides. The bellows are of ordinary design used with sensors and normally are at a rest or balanced position as shown. A first pressure inlet 20 is connected to the bellows 15, and a second pressure inlet 21 is open to the bellows 16. The bellows, of course, when subjected to pressure will tend to expand axially and extend their inner ends adjacent the tang 23 and clamp 23A. Thus, as shown, differentials in pressure will cause a shift in the position of the tang 23.

The clamp 23A can be slid and adjusted transversely to the direction of movement of the bellows along tang 23 so that the moment of bellows 16 about the hinge like pivot shown at 27 can be shifted with respect to the moment of the bellows 15 about hinge 27. This movement of the clamp 23A along the tang 23 permits adjustment of the force from one bellows or the other so that when equal pressure is applied to bellows 15 and 16, the resultant force (moments) is zero.

The lever assembly 24, as shown in plan view, includes a mounting block 25 that in turn is attached to the base wall 12 of the housing 11. The lever assembly 24 is made from a unitary piece of material. A moving lever portion 30 is joined to block 25 through a hinge-like pivot shown at 27. The pivot is formed as a substantially reduced cross section thickness joining the block 25 and portion 30 along the axis of pivot. Thus the lever assembly has a mounting portion 25 and a pivoting lever portion 30. The pivoting lever portion 30 clears the base 12 of the housing so that it may pivot under pressure differentials. Suitable spacers may be placed under block 25 to raise the lever portion 30 away from base 12.

The lever portion 30 pivots about the hinge or pivot portion 27, which has little stiffness to pivoting, but has great stiffness resisting twisting of the lever portion 30 about an axis parallel to the plane of pivotal movement. This stiffness is also effective against acceleration in a direction along the pivotal axis. The lever portion is connected to tang 23 by a connector section 31.

A loading beam indicated generally at 35 is made of a single block of magnetic material, preferably Ni-Span C, alloy 902, made by the International Nickel Company. Loading beam 35 includes a center vibrating beam section 42 that is positioned between and integral with first and second isolator sections 43 and 44 which support the vibrating beam section 42. Isolator section 43 is mounted at its outer end opposite its junction to the vibrating beam section as at 36 to a support lug 37 which can be part of the block 25. The outer end of isolator section 43 may also be separately mounted to the base 12 of the housing. The connection to support 37 is a fixed connection, such as soldering or brazing. The outer end of the isolator section 43 can also be pinned or fastened with suitable cap screws.

The outer end of the isolator section 44, which is the opposite end of the loading beam 35, is mounted as at 40 to a support 41 protruding from the pivoting lever portion 30. The mounting can be made in any desired manner.

The sensor assembly is acceleration balanced on at least two axis, that is, an acceleration in the "Y" axis or the "X" axis shown in FIG. 1 will have little or no effect as the sum of the torque moments on the sensor side of the pivot axis is the same as the sum of the torque moments on the bellows side. The sensor is not so balanced in the "Z" axis (shown in FIG. 7) as the stiffness of the pivot is effective in substantially reducing acceleration effects from a force applied along this axis. It is also possible to balance the torque moments about this axis if desired. Due to tolerances, every sensor assembly has a somewhat different torque moment. The effect of these tolerances with respect to acceleration preferably is minimized by depositing small amounts of a material, preferably solder in the areas near pivot 27 to equalize the torque moments about that axis as shown at 27A in FIG. 1.

The vibrating beam section 42 is thus supported by isolator sections 43 and 44 between supports 37 and 41. The beam section 42 is thus subjected to forces that are exerted by movement of the pivoting lever portion 30. The isolator sections 43 and 44 are each relieved in its center portion to form a pair of thin straps.

It can be seen therefore that any movement of the tang 23 between the bellows 15 and 16 because of deflections or movements of the bellows will cause the tang 23 to pivot the pivoting lever portion 30 about pivot 27. The movement causes a change in the tension or compression stress or loading of the vibrating beam section 42. The change in loading of the vibrating beam section 42 will change its resonant frequency of vibration. The change in resonant frequency will be proportional to the pressure differential present in pressure inlets 20 and 21, and thus the bellows 15 and 16. One pressure inlet can be open to atmosphere or be evacuated, so that value of an individual pressure can be measured as well. Further, one bellows may be removed.

The beam is driven or excited into resonance through the use of a coil which in turn is excited by an AC signal controlled at resonant frequency. Further, at rest the beam is nominally balanced, not in compression nor tension; thus is not subject to creep and relaxation of the supporting structure or the beam, which contribute to stability problems. Preferably, the beam is operated at lower stresses within the elastic limits of the beam material.

The isolators 43 and 44 each include a mass 43A and 44A extending perpendicular to the beam section 42 and each has spaced isolation springs 43B and 43C and 44B and 44C, respectively. These isolators decouple the vibrating beam section 42 from the end mountings to reduce energy losses which lower the beam "Q". It should be noted that small stress reducing radii are used at the junction between vibrating beam section 42 and the masses 43A and 44A.

In the design of the beam section 42 and isolators 43 and 44 it is important that no single element has a natural frequency that can be easily driven by the beam section 42 itself which must sweep a wide frequency range to be useful. If the other elements have a natural frequency which can be driven by the beam section 42, the beam section 42 will tend to excite such element in the system, particularly if its natural frequency is equal to or in some multiple of (i.e. 1, 2, 3, and 4 times) beam frequency. When this happens the effectiveness of the isolators is reduced thus reducing the beams "Q" and changing its frequency. The result of this is a sharp discontinuity in the beam's linearity or smoothness with applied stress. In addition, it can be seen that the center beam can be easily driven at its resonant frequency and two times its resonant frequency, since with each half cycle of the beam there is one pull on the ends of the vibrating beam section 42. The beam deflects to opposite sides of its at rest plane during operation.

In practice, it is not possible to make the isolators so low in frequency that they cannot be driven by the vibrating beam since they would have to be very long and thin. Thus the overall sensor size would be large and the system would be difficult to manufacture. It is possible as discussed above, for the vibrating beam section to drive the isolator springs at their second, or third or higher order harmonics.

Also, in practice it is not possible to make these isolator springs so high in frequency that they cannot be driven and still provide the necessary low frequency isolation. Thus it can be seen that the isolator spring frequency must be chosen to provide a "window" so as not to interfere with the vibrating beam section 42 through its stressed frequency range. That is, when stress is applied to the vibrating beam section 42 its natural frequency and twice this frequency should not coincide with prominent resonant frequencies of the isolator springs 43B and 43C and 44B and 44C. The widest "window" is provided when the fundamental isolator spring frequency for each of these four springs is greater than the highest vibrating beam section frequency, which occurs at full scale stress, but lower than twice the rest frequency of the vibrating beam section 42.

A specific example of the beam section 42 includes a beam section 0.0047 inches thick, with approximate limits of not less than 0.001 inches and not greater than 0.010 inches. The beam section is 0.250 inches long, with approximate limits of not less than 0.10 inches and not greater than 0.50 inches and it is 0.042 inches wide, with approximate limits of not less than 0.020 and not greater than 0.100.

The unstressed natural frequency is directly proportional to the beam thickness and inversely proportional to the square of the beam length and is about 14.5 KHz using a suitable material such as Ni-Span C. Ni-Span C is used for its unique combination of excellent spring properties and substantially zero temperature coefficient over a wide range of temperatures. Other natural frequencies could have been chosen.

The change in frequency is determined by the stress in the beam which is generated by the force provided by the lever assembly 24. In one example, this is about 2.5 pounds provided by one-half inch diameter bellows at one atmosphere. The stress in the vibrating beam section 42 can be adjusted without changing the beam section's unstressed frequency by changing the width. In the example, the stress was adjusted to about 10,000 psi using Ni-Span C. This stress is ideal since it is very low compared to the yield strength of Ni-Span C and thus an extremely low system hysteresis errors result. In addition, long term changes in frequency are not encountered. The resulting change in frequency of vibrating beam section 42 is about 2300 Hz or about 16% of full scale frequency which can be provided either by putting the beam in compression or in tension. Thus, for this example, a zero to one atmosphere pressure change yields a resonant frequency change from 14.5 KHz up to 16.8 KHz.

For the isolator springs, as discussed above, the frequencies are adjusted in the same manner as for the vibrating beam section 42, to be greater than 16.8 KHz but less than two times 14.5 KHz or 29 KHz. In practice it has been found that an isolator spring frequency of between 22 KHz to 24 KHz works well. The springs 43B and 43C and 44B and 44C are made 0.012 inches thick by 0.315 inches long for simpler construction. The isolation mass (43A and 44A) is thus adjusted to yield an isolator system frequency of 2600 Hz, which provides an excellent isolator to vibrating beam section frequency ratio and thus a very low transmissibility.

The mechanical construction of the coil and pick-off is shown in FIGS. 1 through 4, in particular. As shown, a ceramic mounting block 50 is mounted onto a disc member 51. The disc member is metal and can be brazed to the block 50 in a usual manner. If desired, the block may be pinned to the disc. The disc member 51 fits within a recess 52 in the base 12 (see FIG. 2) of the housing, so that the block 50 protrudes into the housing. The disc can be rotated in the recess 52 to a desired position. The disc is then soldered into place to hold it securely in rotational position during use. The block 50 is made of a nonmagnetic, nonelectrical conducting solid material such as machinable sintered alumina or a similar ceramic material. As shown, the block 50 includes a raised portion 53 that has a surface 53A which is closely adjacent and parallel to the plane of the vibrating beam section 42. The block 53 fits between the ends of isolator sections 43 and 44. Block 53 has a cylindrical recess 54 defined therein extending inwardly from a surface 57 opposite from the surface 53A (see FIG. 3). A mandrel member 55 is mounted in this recess, and can be bonded to the block 53 by electrically conductive epoxy or solder. The mandrel 55 is preferably made from magnetic stainless steel, and preferably a high "mu" or high magnetic permeability material.

The mandrel has a disc end 56, and between the surface 57 of the block 53 and the disc 56, there is a coil indicated at 58 that is wound in place. This is generally a single wound coil, having a suitable number of turns to generate the necessary magnetic force for driving the beam as will be explained.

On face 53A of the block 53 that is adjacent and facing the vibrating beam section 42, an electrically conductive strip 61 forming a capacitor plate is screened onto the ceramic material and then fired in place. The capacitor plate 61 is shown in FIG. 4. Additional electrical components can be mounted directly to the surface of the ceramic block 50, and the various components connected to the capacitor plate by screened on strips of conductive material. Such components are identified subsequently in this specification.

The surface 57 of the block 53 which is adjacent to the coil 58, and on an opposite side of the block 53 from the capacitor plate 61, may be metalized to provide for a shield to prevent interference from the current in the coil 58 from affecting the capacitance sensed between the vibrating beam section 42 and the capacitor plate 61.

It can be seen that by rotating the disc 51, the spacing between the capacitor plate and the vibrating beam section 42 can be adjusted at the time of assembly. The block 50 and plate or disc 51 are installed after the beam 35 is in place. The spacing between plate 61 and the vibrating beam section 42 is about 0.005 inches.

The vibrating beam section 42 of the beam forms the other plate of a variable capacitor in conjunction with plate 61. The vibrating beam section 42 is grounded. Note that block 50 may be supplied with circuit feed through pin 50A and connector openings 50B if desired.

In FIGS. 6 and 7, a modified form of the construction is shown. The beam 35, and the lever assembly 24 (in particular the pivoting portion 30) and the bellows mounting are substantially the same. The mounting block 25 is modified for mounting a modified drive and pick-off sensor assembly 74. A shaft 75 is mounted in a provided opening in the block 25, as can be seen in FIG. 6 and suitable set screws 76 permit the longitudinal adjustment of the shaft 75 relative to the vibrating beam section 42. The shaft 75 in turn is attached to a disc 79 which has a rod 78 extending coil support mandrel outwardly therefrom. The disc 79 can be bonded to the end of the shaft 75 in the usual manner with epoxy or other bonding material. A coil 82 is wound onto the mandrel 78 between the inner surface of the disc 79 and a surface 83 of a ceramic disc pick-up member 84. It should be noted that the coil mandrel 78 extends into a recess in the ceramic disc 84, a desired distance, and this mandrel 78 is suitably fastened to the ceramic pick-up to hold the two parts together and in place after the coil has been wound into place on the coil mandrel.

Figure 8:
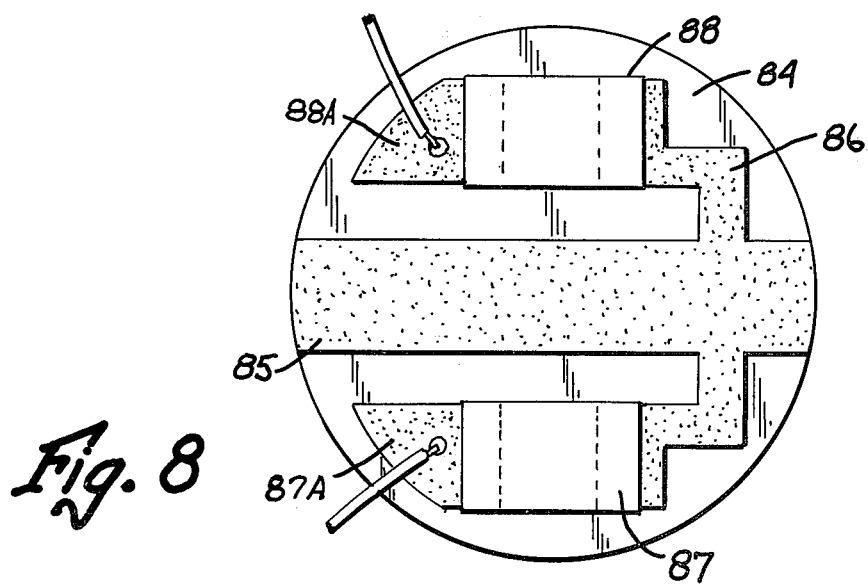
FIG. 8 is a view taken as on line 8—8 in FIG. 7.

The ceramic disc 84 as shown also has electrically conductive surfaces shown by shading in FIG. 8 thereon thereby permitting the circuitry or portions thereof to be mounted proximate to the beam. The components mounted on the disc 84 preferably include a capacitor plate 85 which corresponds to the plate 61, with suitable connecting strips 86 which lead to a thick film hybrid resistor 87, and thick film capacitor 88 which can be cemented to and electrically connected to the strips 86. Suitable contact points 87A and 88A can be provided for connecting to the other ends of the capacitor 88 and resistor 87. As can be seen, the hybrid capacitor 88 and the resistor 87 are mounted closely adjacent to the capacitor plate 85, and protrude from the ceramic disc member so that the vibrating beam section 42 fits between these two components. The vibrating beam section 42 is spaced closely from, and generally parallel to the capacitor plate 85.

In operation, the beam in either form of the invention is vibrated by energizing the associated coil. A magnetic flux is generated and causes the vibrating beam section 42 to deflect in opposite directions generally perpendicular to its longitudinal plane. The mandrel 55 or 78 extends through the ceramic block 53 or 84 a substantial distance so that the magnetic field is coupled to the beam section 42. The changes in capacitance of the capacitor are sensed and in effect control the drive circuit to resonate the beam section as well as provide a frequency output. Any change in differential pressure causes a shift of the tang which results in pivoting lever portion 30 about the pivot axis 27 to change the compression or tension load on vibrating beam section 42, causing a change in the resonant frequency of the beam. The change will be sensed by the changing of the frequency of the signal from the capacitor formed between vibrating beam section 42 and either plate 61 or plate 85, depending on the sensor that is positioned adjacent the beam. This change in signal is representative of the differential in pressure in relation to the reference pressure frequency. Preferably the beam is driven at its fundamental frequency, however, the capacitor pick-off permits relocation of the pick-off capacitor as to be sensitive to any desired harmonic of the fundamental frequency or other desired frequency.

Figure 9:
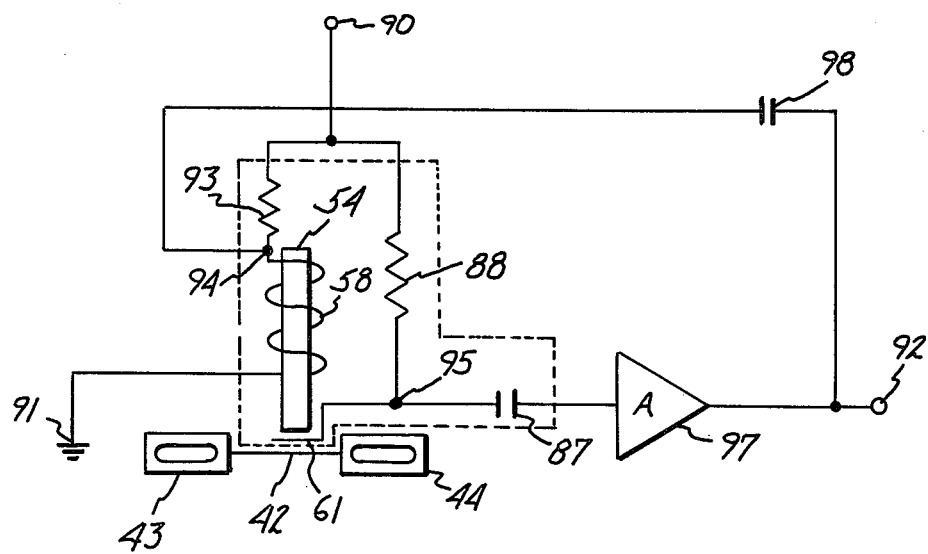
FIG. 9 is a schematic representation of a simplified drive and sensing circuitry used with the sensor of the present invention.

FIG. 9 shows a simplified electrical schematic diagram of a circuit for deriving a frequency output signal from the vibrating beam of the present invention. The circuit can be in several different embodiments. In FIG. 9, vibrating beam section 42 is shown supported between isolators 43 and 44 as described previously. A capacitive pickup electrode shown at 61 (it could also be electrode 85) is spaced from vibrating beam section 42 to form a variable capacitor.

The circuit shown in FIG. 9 includes a supply voltage terminal 90, a ground terminal 91, and an output terminal 92. A source (not shown) of a supply voltage V+ is connected to supply voltage terminal 90. Connected between terminal 90 and ground terminal 91 are a resistor 93 and coil 58 (or 82). A DC current flows through resistor 93 and coil 58 to produce a steady magnetic field out of mandrel or core 54 (or 75). The steady magnetic field produced by the DC current through coil 58 could be replaced by a permanent magnet, if desired.

Also connected between terminal 90 and pick-off electrode 61 is a bias resistor 88 (shown mounted on the ceramic disc in FIG. 7). Bias resistor 88 provides a DC bias current at junction 95 where resistor 88 and electrode 61 are connected. As a result, the voltage across the variable capacitor formed by vibrating beam section 42 and pick-off electrode 61 is a function of the DC current and the frequency of vibration of vibrating beam section 42.

The signal derived from junction 95 is provided through a filter capacitor 87 (shown mounted in FIG. 7) to an amplifier 97. The amplifier output of amplifier 97 is supplied to output terminal 92 as the output signal of the circuit. The output of amplifier 97 is also connected through feedback capacitor 98 to junction 94, which is the junction of resistor 93 and drive coil 58.

When the circuit is turned on the magnetic field from coil 58 will shift the beam section 42. The capacitance between the beam section 42 and plate 61 affects the input to amplifier 97 through bias resistor 88 and capacitor 87. The output of amplifier 97 changes the feedback signal on capacitor 98 which in turn affects the current through coil 58. Any change in current through coil 58 changes the magnetic field through vibrating beam section 42 and the vibrating beam section 42 will again shift. The vibrating beam section 42 thus is excited to its natural frequency and the output of amplifier 97 will vary at this frequency. The components are selected to provide appropriate phasing to provide the oscillations at the desired frequency range.

The circuit shown in FIG. 9, therefore, derives a time varying output signal whose frequency is a function of the frequency of beam section 42. This output signal can then be converted to a digital or an analog signal, and provides an indication of the tension or compression in beam section 42 which changes the frequency and which is a function of the pressure to be sensed.

The actual circuit components for the amplifier 97, and other components for converting the signal at output terminal 92 to a digital or analog signal can be mounted as shown schematically in FIG. 1, or, if desired, all of the components may be mounted on block 50 as shown in FIG. 4.

If low frequency vibrations from external sources (such as aircraft vibrations if the sensor is used in an aircraft) cause low frequency oscillation in the output signal and suitable filters can be used to eliminate any such unwanted oscillations.

As explained herein, pressure on the bellows creates a force on the tang which through the lever portion results in a change in the tension or compression stress or loading of the beam. A force on the tank provides the same result.

What is claimed is:

1. A pressure sensor providing an output signal that is proportional to the natural frequency of a vibrating beam having a longitudinal axis, comprising;
   a base;
   means to mount one end of said beam with respect to said base;
   an actuator;
   a first end of said actuator being operably coupled to an opposite end of said beam from the attachment of said beam to said base;
   means to apply a pressure signal to said actuator to cause said actuator to change the force exerted on said beam by said actuator in direction along the longitudinal axis of said beam;
   drive means having a longitudinal axis substantially normal to the longitudinal axis of the beam to provide a driving signal to oscillate said beam at its natural frequency;

and pick-off means to sense the frequency of oscillation of said beam, said drive means and pick-off means being fixed relative to each other and coupled as a unit to said base on the same side of the beam.

2. The sensor of claim 1 wherein said drive means comprises electromagnetic drive means.

3. The combination as specified in claim 2 wherein said pick-off means in a plane substantially parallel with the beam comprises a capacitor plate.

4. The combination specified in claim 1 wherein said actuator comprises a lever pivotally mounted on said base.

5. The combination specified in claim 4 wherein said lever extends along its pivot axis substantially more than the width of said beam in the same direction, a support block for said lever mounted on said base, said support block and said lever being formed from a single piece of material, said pivotal mounting of said lever comprising a section of material substantially reduced in thickness in direction perpendicular to the pivot axis and to the longitudinal axis of the beam to form a hinge action pivot elongated along the pivot axis between said lever and said support block.

6. The sensor of claim 1 wherein said means to apply load is a force.

7. The pressure sensor as specified in claim 1 wherein substantially no current is passed through the vibrating beam.

8. The pressure sensor of claim 1 wherein said actuator comprises a pivoting lever made of metal which pivots about a lever pivot axis perpendicular to the longitudinal axis of the beam to load the beam in tension, said lever being subject to acceleration forces in direction tending to pivot the lever about the lever pivot axis, and thereby change the loading on the beam, and a selected mass of solder physically adhering to said lever in position relative to the lever pivot axis to balance the moments created about the lever pivot axis when the lever is subjected to acceleration forces.

9. A pressure transducer of the vibrating member type wherein said vibrating member is oscillated at a frequency dependent upon the stress in the vibrating member and the frequency of oscillation is sensed as a measurement of pressure having:

a base;
an elongated vibrating member having first and second ends;
means to mount said vibrating member relative to said base at one end thereof;
first means sensitive to a pressure signal coupled to the vibrating member to change the stress in said vibrating member as a function of the pressure signal;
electromagnetic driver means for controlling oscillation of said vibrating member responsive to the pressure signal thereon; and
second means to sense the oscillation of the vibrating member comprising a block of electrically nonconductive material disposed on the base and having a capacitor plate deposited thereon and positioned adjacent the vibrating member, said vibrating member having a flat surface facing said capacitor plate which, responsive to the pressure signal, moves toward and away from the capacitor plate during oscillation.

10. The combination of claim 9 and means to adjustably couple the block to the base.

11. The combination of claim 9 wherein said electromagnetic driver includes a current carrying coil, a mandrel, said coil being wound on said mandrel, said block of electrically nonconductive material being mounted on said mandrel between said coil and said vibrating member, said block having one surface adjacent said vibrating member.

12. The combination as specified in claim 11 wherein said mandrel includes a portion extending into said block of material a substantial distance to provide for a path of conduction of magnetic flux to a position adjacent to said vibrating member.

13. The combination as specified in claim 11 wherein the surface of said block of material adjacent said coil has a metalized layer on the side thereof facing said coil.

14. The combination as specified in claim 11 wherein the surface of said block of material adjacent said vibrating member is larger in transverse dimension than the portion of the vibrating member with which it is used, and the second means for sensing includes said capacitor plate including electrical components mounted directly on said block of material in position not aligned with the vibrating member.

15. A sensor providing an output signal that is proportional to the natural frequency of an elongated vibrating beam comprising a base;

means to mount one end of said beam with respect to said base;
an actuator mounted on said base and having a first end connected to an opposite end of said beam from the attachement of said beam to said base;
means to apply load to said actuator to cause changes in the stress in said beam in direction along the longitudinal axis of said beam;
a coil and pick-off sensor assembly mounted on said base, said pick-off sensor comprising a capacitor plate adjacent one side of said beam and said coil being on an opposite side of said capacitor plate from said beam;
means connecting said coil in an energization circuit to provide oscillating flux to vibrate said beam and means connecting said capacitor in said circuit to control oscillation of said flux in response to capacitance changes between said beam and capacitor plate.

16. In a pressure transducer of the vibrating beam type having a base, means to drive a vibrating beam to oscillate at its natural frequency, which varies as a function of the stress in the vibrating beam, means to sense the frequency of oscillation of the beam as a measurement of pressure and having means responsive to pressure to be sensed to exert a tension on the beam as a function of pressure, the improvement comprising:

a vibrating beam comprising a center beam section having a natural frequency which changes with stress in the center beam section;
means to mount a first end of said center beam section relative to the base;
means to mount a second end of said center beam section to the means responsive to pressure whereby the tension in said center beam section changes from a first stress condition when the pressure to be measured is at a minimum to a fully stressed condition when the pressure to be sensed is at a maximum;
said means to mount the first and second ends of said center beam section comprising first and second spring assemblies forming isolators, respectively;

one end of the first isolator being connected to the first end of said center beam section and the other end of the first isolator being connected to the base;

one end of said second isolator being connected to the second end of said center beam section and the other end of the second isolator being connected to the means responsive to pressure;

said spring assemblies comprising the isolators each having a fundamental natural frequency greater than the natural frequency of the center section when the center beam section is fully stressed, and lower than twice the natural frequency of the center beam section when the center beam section is at its first stress condition.

17. The combination as specified in claim 16 wherein said isolators each comprise a pair of generally parallel, spaced apart spring blade members joined together at the opposite ends thereof, and wherein each of said blade members individually has a fundamental natural frequency greater than the natural frequency of the center beam section when the center beam section is fully stressed and lower than twice the natural frequency of the center beam section when the center beam section is at its first stress condition.

18. The combination as specified in claim 17 wherein the means to join each pair of blade members adjacent the center beam section comprises a mass selected to provide an isolator frequency that is substantially lower than the lowest natural frequency of the center beam section during use.

* * * * *